US006675522B2

(12) United States Patent
Mathews (10) Patent No.: US 6,675,522 B2
(45) Date of Patent: Jan. 13, 2004

(54) CABLE-DRIVEN ANIMATED BIRD REPLICA APPARATUS

(75) Inventor: Robert Mathews, Marysville, CA (US)

(73) Assignee: Huntwise, Inc., Bastrop, LA (US)

( * ) Notice: Subject to any disclaimer, the term of this patent is extended or adjusted under 35 U.S.C. 154(b) by 0 days.

(21) Appl. No.: 10/349,266

(22) Filed: Jan. 21, 2003

(65) Prior Publication Data
US 2003/0110676 A1 Jun. 19, 2003

Related U.S. Application Data (63) Continuation-in-part of application No. 29/157,452, filed on Mar. 18, 2002, now Pat. No. Des. 469,152, which is a continuation of application No. 09/737,330, filed on Dec. 12, 2000, now Pat. No. 6,408,559, which is a continuation-in-part of application No. 09/273,875, filed on Mar. 22, 1999, now Pat. No. 6,170,188.

(51) Int. Cl.⁷ ............................................. A01M 31/06
(52) U.S. Cl. ........................................................... 43/3
(58) Field of Search ....................... 43/3, 2, 19.2, 26.1, 43/26.2, 20, 21

(56) References Cited

U.S. PATENT DOCUMENTS

| | | | | |
|---|---|---|---|---|
| 262,686 A | * | 8/1882 | Myers | 43/2 |
| 303,347 A | * | 8/1884 | Wakeman | 43/19.2 |
| 547,553 A | * | 10/1895 | Keller | 43/3 |
| 1,122,466 A | * | 12/1914 | Beyer | 43/19.2 |
| 1,401,096 A | * | 12/1921 | Neudeck | 43/19.2 |
| 2,129,781 A | * | 9/1938 | Park | 43/3 |
| 2,743,068 A | * | 4/1956 | Walker | 446/32 |
| 2,792,658 A | * | 5/1957 | Stafford | 43/4 |
| 2,801,494 A | * | 8/1957 | Ernst | 446/37 |
| 2,992,512 A | * | 7/1961 | Pettit | 446/37 |
| 3,016,647 A | * | 1/1962 | Peterson et al. | 43/3 |
| 3,465,464 A | * | 9/1969 | De Berry | 43/19.2 |
| 4,535,560 A | * | 8/1985 | O'Neil | 43/3 |
| 4,679,346 A | * | 7/1987 | Angelety, Sr. | 43/20 |
| 4,910,905 A | * | 3/1990 | Girdley et al. | 43/3 |
| 5,105,573 A | * | 4/1992 | Mays | 43/26.2 |
| 5,231,780 A | * | 8/1993 | Gazalski | 43/3 |
| 5,525,086 A | * | 6/1996 | Gentile et al. | 446/37 |
| 5,862,619 A | * | 1/1999 | Stancil | 43/3 |
| 5,930,936 A | * | 8/1999 | Parr et al. | 43/3 |
| 5,974,720 A | * | 11/1999 | Bowling | 43/3 |
| 6,092,323 A | * | 7/2000 | McBride et al. | 43/3 |
| 6,138,396 A | * | 10/2000 | Capps | 43/3 |
| 6,170,188 B1 | * | 1/2001 | Mathews | 43/3 |
| 6,311,425 B1 | * | 11/2001 | Capps | 43/3 |
| 6,321,480 B1 | * | 11/2001 | Solomon | 43/3 |
| 6,339,894 B1 | * | 1/2002 | Solomon | 43/3 |
| 6,357,159 B1 | * | 3/2002 | Bowling | 43/2 |
| 6,360,474 B1 | * | 3/2002 | Wurlitzer | 43/3 |
| 6,374,529 B1 | * | 4/2002 | Petroski et al. | 43/3 |
| 6,408,559 B2 | * | 6/2002 | Mathews | 43/3 |
| 6,430,863 B1 | * | 8/2002 | Krag | 43/3 |
| 6,442,885 B1 | * | 9/2002 | Payne | 43/3 |
| 6,493,980 B1 | * | 12/2002 | Richardson et al. | 43/3 |
| 6,508,028 B1 | * | 1/2003 | Crowe | 43/3 |

FOREIGN PATENT DOCUMENTS

| | | | | |
|---|---|---|---|---|
| CA | 2177498 B1 | * | 11/1997 | |
| FR | 402382 B1 | * | 10/1909 | 43/2 |

(List continued on next page.)

*Primary Examiner*—Darren W. Ark
(74) *Attorney, Agent, or Firm*—Kean, Miller, Hawthorne, D'Armond, McCowan & Jarman LLP (57) ABSTRACT

A cable-driven animated bird replica comprises a decoy housing 12 having the overall configuration of a bird's body, the decoy having a pair of bird wing members 14 extending laterally of the housing and rotating on a common axis, a flexible cable 16 having a first end 122 attached to the housing and in operative communication with the bird wing members, and a second end 124 rotatably attached to a foot pedal 18 such that hands-free rotation of the bird wing members can be controlled from a location remote from the housing without the use of electric power.

31 Claims, 9 Drawing Sheets

FOREIGN PATENT DOCUMENTS

| | | | |
|---|---|---|---|
| FR | 2646588 B1 * | 11/1990 | |
| FR | 2671691 B1 * | 7/1992 | |
| FR | 2671694 B1 * | 7/1992 | |
| GB | 2244199 B1 * | 11/1991 | |
| GB | 2295953 B1 * | 6/1996 | |
| IT | 299962 B1 * | 8/1932 | 43/2 |
| IT | 471206 B1 * | 5/1952 | 43/2 |
| IT | 624517 B1 * | 9/1961 | 43/2 |

* cited by examiner

CABLE-DRIVEN ANIMATED BIRD REPLICA APPARATUS

This continuing application, filed under 37 C.F.R. 1.53 (b), is a continuation-in-part of U.S. patent application Ser. No. 29/157,452, filed on Mar. 18, 2002, now U.S. Pat. No. D469,152, which is a continuation of U.S. patent application Ser. No. 09/737,330, filed Dec. 12, 2000, now U.S. Pat. No. 6,408,559, which is a continuation of U.S. patent application Ser. No. 09/273,875, filed Mar, 22, 1999 now U.S. Pat. No. 6,170,188.

FIELD OF THE INVENTION

This invention relates to animated bird replica apparatuses having a pair of laterally extending bird wing members which rotate on a common axis to simulate a bird in flight in which the wing rotation is driven using a flexible cable attached to the wings, and in particular where the rotation is driven using a foot pedal attached to a remote end of the cable.

BACKGROUND OF THE INVENTION

Animated bird replicas are popularly available in a wide variety of configurations and styles for numerous sporting and recreational activities. Animated waterfowl apparatuses having bird wing members rotating on a common axis have particular application as decoys at a water site where they effectively simulate a bird in flight about to land on the water. Applicant's animated waterfowl decoy apparatus is disclosed in U.S. Pat. Nos. 6,170,188 and 6,408,559. Existing art animated bird replicas drive wing rotation using battery powered motors. While highly effective at attracting waterfowl, these animated decoys can experience dramatically shortened battery life in cold weather conditions typically encountered during their deployment. An additional problem arises from the fact that the motors used in the decoy devices rotate the wing members at a uniform speed. The lack of variation in wing rotation may tend eventually to diminish the attraction of the decoys to wild fowl. Finally, the overall effectiveness of the rotating wing waterfowl decoy has been so remarkably successful that some states have passed regulations prohibiting the use of electronically powered animated decoys for hunting purposes for some or all of the hunting season.

One preliminary solution to these problems involved attachment of a first end of a flexible cable, such as a speedometer cable, to a decoy housing and attaching the second end to a fishing reel. Turning the fishing reel would rotate the bird wing members. However, this model suffered from certain disadvantages. The first disadvantage involved the means by which the first end of the cable was attached to the decoy housing. Inside the decoy housing was provided a retention block which was attached to the housing. A bird wing member support extended between and supported the wings. In addition, a first gear was mounted on the bird wing member support. A vertical transmission shaft had a second gear joined to the first gear. The first end of the cable was detachably connected to the vertical transmission shaft by threading a retention cap on the cable to a nut which was strapped to the retention block. Assembly of the strap and nut to the retention block was difficult and resulted in an unsatisfactory connection of the cable to the housing.

The second disadvantage was that both hands were needed to operate the fishing reel. This was not only tiresome but also interfered with the instant need for both hands when waterfowl attracted by the decoy suddenly appeared.

There is therefore a need for an improved animated bird replica that does not rely on electric power, which can withstand the rigors of wet and cold weather conditions, which will not run afoul of state regulators, provides a more secure connection between the cable and the housing, and does not require both hands for operation of the decoy.

SUMMARY OF THE INVENTION

The present invention relates to a cable-driven animated bird replica providing a housing resembling a bird's body, e.g., a duck with its head in extended position, and a pair of bird wing members. The bird wing members extend laterally from opposite sides of the housing and are fully rotatable around a common axis. As the bird wing members rotate, they resemble the extended wings of a bird in flight.

The rotary force to drive the wing members is delivered by a flexible cable. A first end of the cable is rotatably connected to the wing members and a second end is rotatably connected to a foot pedal. Depression and release of the foot pedal rotates the second end of the cable which, in turn, rotates the first end of the cable and, hence, the wings. The first end of the cable is firmly attached to the retention block in the housing with a tubular sleeve having an integral threaded-portion. The tubular sleeve is inserted in a vertical channel provided in the bottom of the retention block wherein it is firmly held by the close tolerance between the outer diameter of the sleeve and the inner diameter of the channel. Set screws further secure the sleeve in the channel.

An elongated support stand is provided for anchoring the replica in the earth under a body of water at a height sufficiently above the surface of the water such that the housing and extended rotating bird wing members simulate a bird in flight near the surface of a body of water with wings extended as though about to land.

The entire apparatus is easily assembled and disassembled. To use decoy, the support stand is anchored in a selected location, the housing is placed on the support stake, the cable is laid out and attached to the housing on one end and to the foot pedal from a selected remote location on the other end. The wings of the decoy are therefore rotatable in a controlled manner by operating the foot pedal from the remote location. At the end of the day, the wings are capable of being folded neatly away against the housing or may be quickly removed therefrom. The first end of the cable is joined to the housing using a threaded coupler which is easily unscrewed. The second end of the cable is affixed to the foot pedal in similar fashion. The assembled elements of the combination may therefore a quickly broken down by detaching the cable from the housing and the foot pedal, coiling the cable, and removing the housing from the support stake. The collected parts can then be conveniently stored in a single box.

The invention has the distinct advantage over the prior art of being human-powered thereby avoiding battery-related power problems. Since the apparatus eliminates the use of motors, it operates virtually noise free. The pedal operation of the invention makes it possible for the first time to control the speed of rotation of the wings, allowing an operator to instantly change the rotational speed in reaction to changing conditions, all the while retaining use of both hands. The invention may also avoid restriction under existing regulations prohibiting electric-powered decoys.

It is therefore an object of the invention to provide an animated bird replica having dual wings rotatable on a common axis and a flexible cable rotatably attached to the wings such that rotation of the wings may be driven at a remote location by rotating the remote end of the cable.

A further object of the invention is to provide an animated bird replica having a housing and dual wings remotely moveable using a flexible cable firmly attached to a retention block in the housing.

A still further object of the invention is to provide an animated bird replica having dual wings rotatable on a common axis wherein rotation of the wings may be driven by a foot pedal at a location remote from the wings via a flexible cable rotatably attached at one end to the wings and at the other to the foot pedal.

BRIEF DESCRIPTION OF THE ILLUSTRATIONS

DETAILED DESCRIPTION OF THE ILLUSTRATED EMBODIMENTS

A cable-driven animated bird replica apparatus according to the invention is illustrated in the attached drawings and described below.

Figure 1:
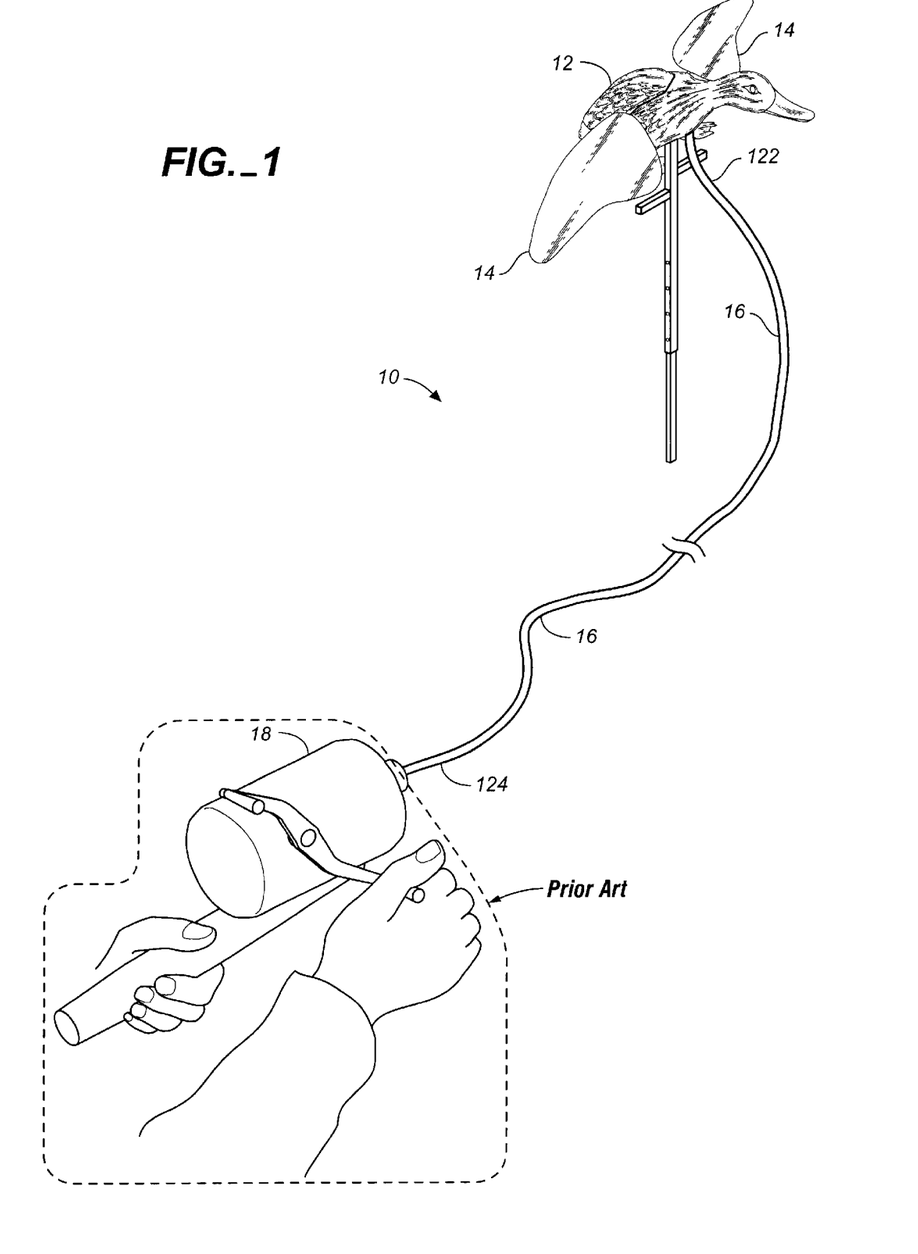
FIG. 1 is a perspective view of a cable-driven animated bird replica apparatus showing a fishing reel in the foreground used in the prior art.
Figure 2:
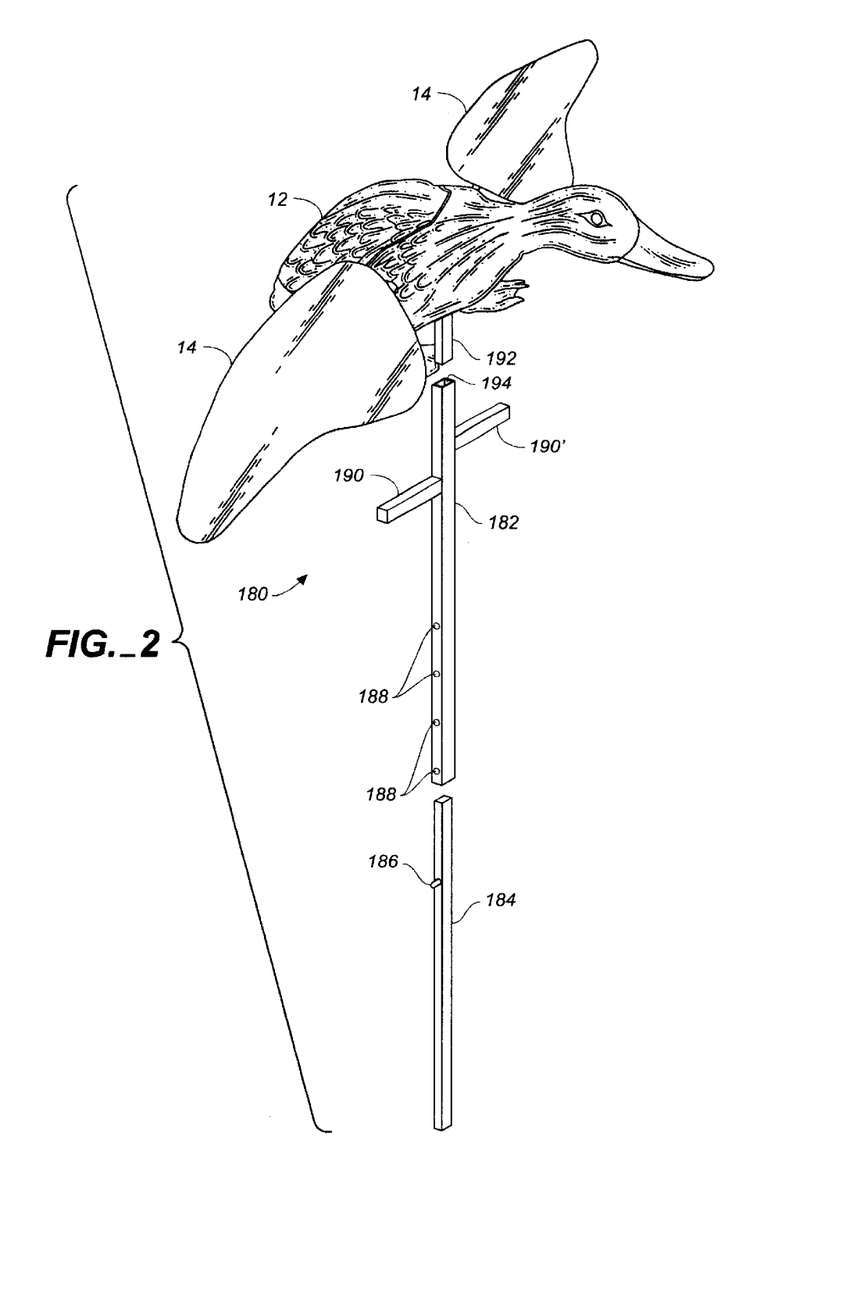
FIG. 2 is an exploded perspective view of the bird replica and support stake according to the invention.
Figures 6, 6A:
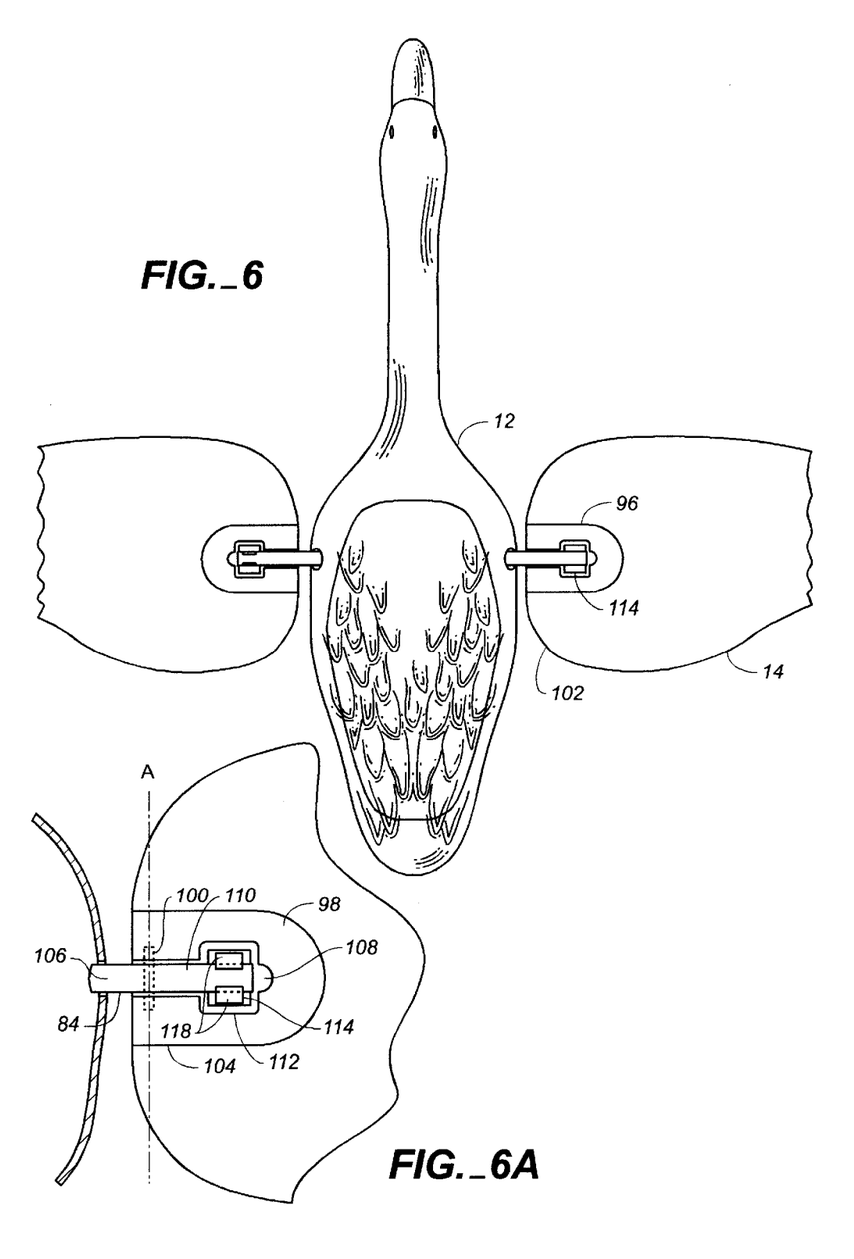
FIG. 6 is a top plan view of an alternate embodiment of the invention wherein the bird replica is in the form of a goose.
FIG. 6A is a closeup sectional view of the hinge for joining the wings and the housing of the bird replica.
Figure 7:
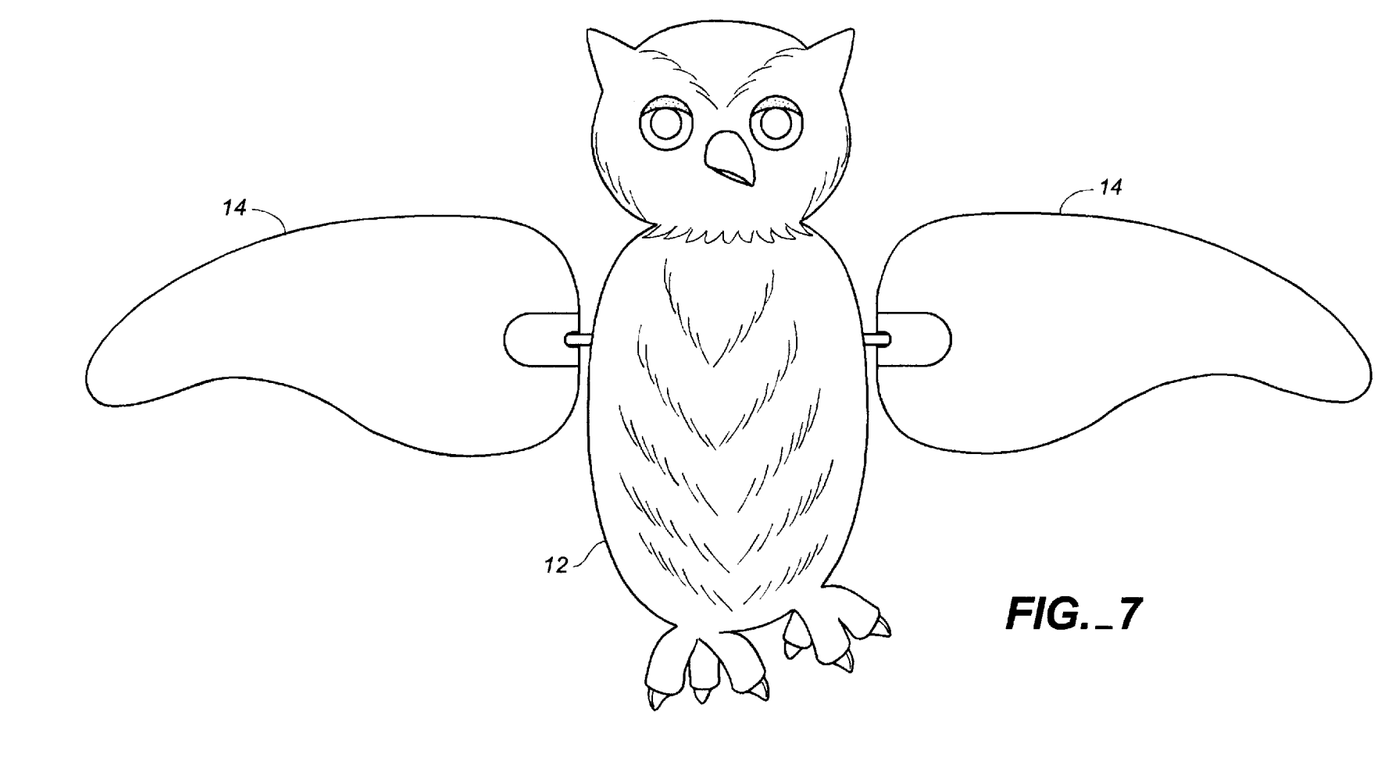
FIG. 7 is a front elevation view of a second embodiment of the invention wherein:
the bird replica is in the configuration of an owl.
Figure 8:
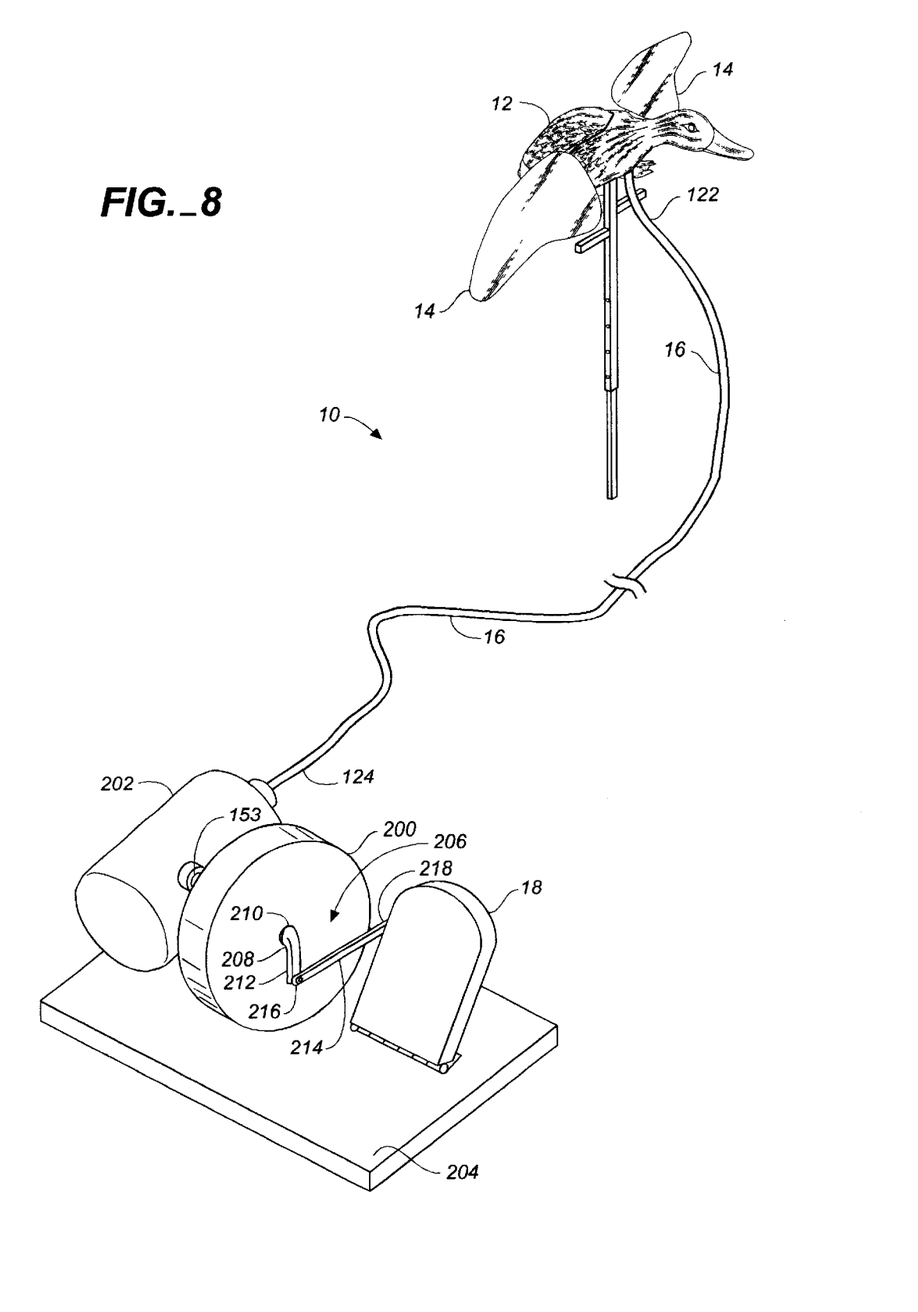
FIG. 8 is a perspective view of a cable-drive animated bird replica apparatus according to the invention.

A cable-driven animated bird replica 10 is shown generally in FIG. 8 and includes a decoy housing 12, a pair of bird wing members 14, a flexible cable 16, and a foot pedal 18. The decoy housing 12 has the overall configuration of a bird's body, preferably a duck. In alternate embodiments, the housing could comprise the configuration of virtually any bird's body, for example, a goose (as shown in FIG. 6), an owl (as shown in FIG. 7), or a dove (not illustrated). Referring to FIGS. 1 and 2, the bird wing members 14 extend from opposite sides of the housing 12 and simulate the moving wings of a bird. While one of the preferred uses of the invention in the case of a waterfowl replica is to attract birds, another purpose of other configurations, such as that of an owl, may be to scare away other birds.

Figures 3A, 3B:
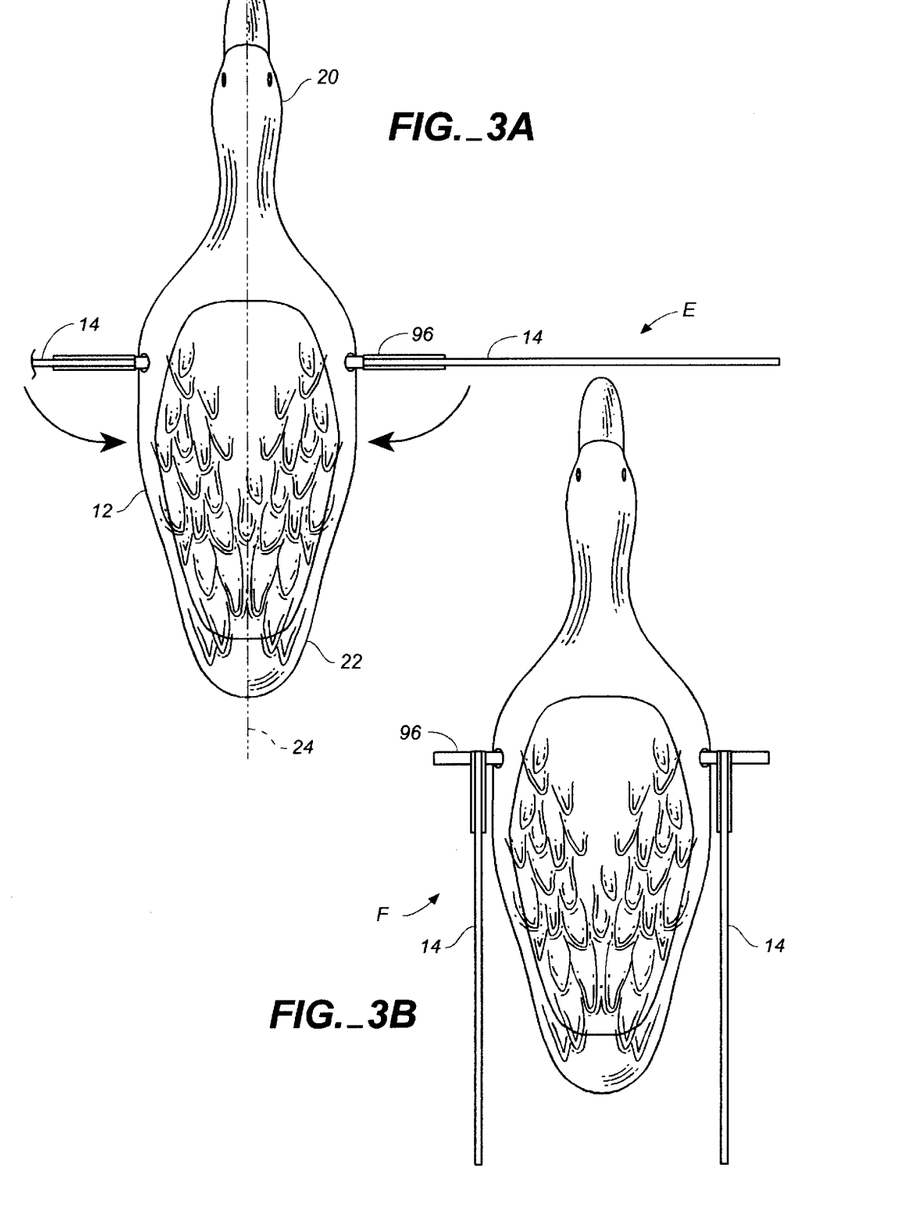
FIG. 3A is a top plan view of the bird replica shown in FIG. 1, with wings shown in extended position.
FIG. 3B is a top plan view of the bird replica shown in FIG. 3A, but with wings in a folded position.

In the embodiment illustrated in FIGS. 2, 3A and 3B, the housing 12 has a head end 20, a tail end 22, and a longitudinal axis 24 extending generally between the head end 20 and tail end 22. A pair of bird wing members 14 extends laterally from the housing 12 and rotates around a common axis.

Figure 4:
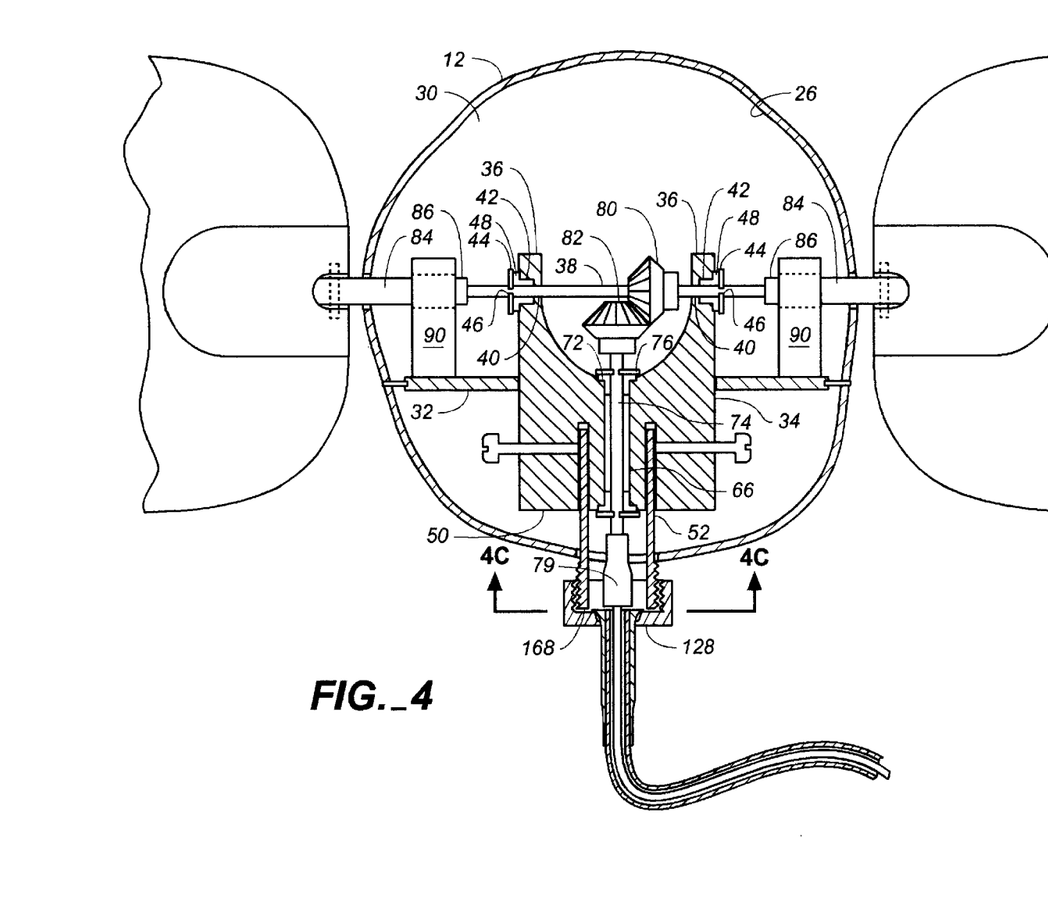
FIG. 4 is a partial cutaway view of the interior of the housing of the bird replica according to the invention.

Referring now to FIG. 4, the housing 12 of the invention has an interior surface 26 defining an interior cavity 30. A chassis 32 is disposed in and firmly attached to the interior surface 26 of the housing 12 from within the interior cavity 30. A retention block 34 is in turn screwed to the chassis 32, thereby holding it securely in place relative to the housing 12. The retention block 34 is generally U-shaped and is provided with two generally parallel upper extensions 36. A bird wing member support 38 is rotatably supported in a pair of aligned holes 40 in the upper extensions 36. In the preferred embodiment each hole 40 is lined with a durable metal bearing 42 for the bird wing member support 38 which act as containment bushings. Lateral travel of the bird wing member support 38 relative to the housing 12 is restricted by retaining clips 44 fastened in circumferential recesses 46 in the support 38 immediately adjacent the bearings 42. Each bearing 42 has an outward facing collar 48 having approximately the same diameter as the retaining clips 44. The collars 48 protect the upper extensions 36 from wear caused by the retaining clips 44 which tend to rotate along with the bird wing member support 38 in close proximity to the upper extensions 36 of the retention block 34. The bird wing member support 38 thus rotates freely in the retention block 34 but is tightly restricted against lateral travel relative thereto.

Figure 4A:
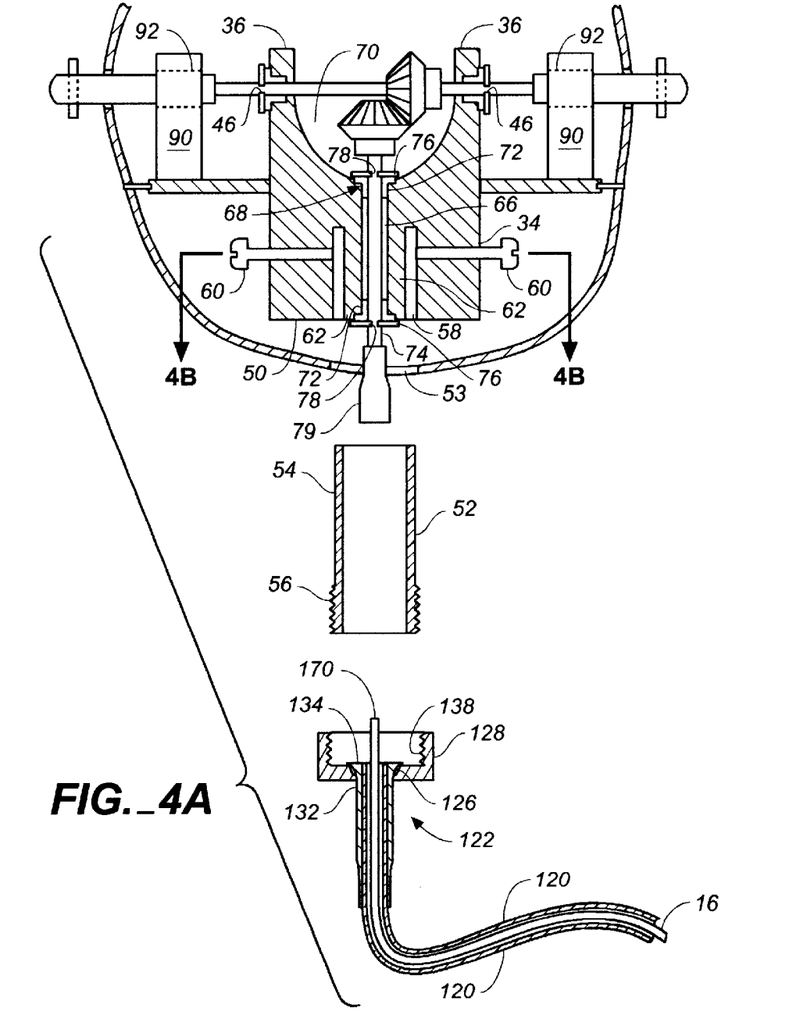
FIG. 4A is a disassembled partial view of the housing and cable elements of the invention shown in FIG. 4.

Referring still to FIGS. 4 and 4A, attached to the bottom 50 of the retention block 34 is a threaded sleeve 52 which extends from the bottom of the retention block 34 through a hole 53 in the underside of the housing 12. The threaded sleeve 52 has an uppermost smooth tubular portion 54 and, at its lower end, a threaded portion 56. An annular recessed channel 58 provided in the bottom 50 of the retention block 34 has an outer diameter just greater than the diameter of the sleeve 52 such that when the tubular portion 54 of the sleeve 52 is inserted into the channel 58 a snug fit is achieved admitting of virtually no lateral movement perpendicular to the longitudinal dimension of the sleeve 52. A pair of set screws 60 are set in the sides of the retention block 34 and, with the already snug fit of the sleeve 52 in the channel 58, securely attach the sleeve 52 to the retention block 34. It will be understood that the sleeve 52 may be affixed to the retention block 34 by a variety of means, e.g., by an adhesive or by screwing the threaded portion to a nut attached to the retention block. In an alternate embodiment of the invention which is not illustrated, the sleeve is replaced by a post portion of the retention block which extends downward through the hole 53 in the underside of the housing 12. A bottom portion of the post is threaded for mating with the threads of the retention cap 128 as discussed in greater detail below. In this embodiment, the cable is thus joined directly to the retention block 34.

Figure 4B:
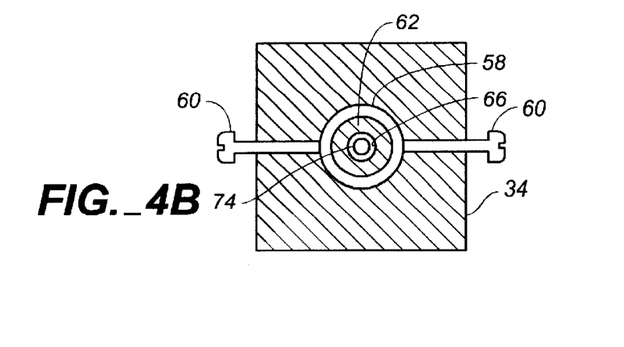
FIG. 4B is a sectional view taken along lines 4B—4B of FIG. 4A.

Inside the channel 58, a core portion 62 of the retention block 34 is preserved. See FIG. 4B. A vertical bore 66 in the retention block 34 extends from the nadir 68 of the U-shaped opening 70 between the upper extensions 36 of the retention block 34 through the core portion 62 of the retention block 34 to the bottom 50 of the retention block. As with the holes 40 for the bird wing member support 38, each end of the vertical bore 66 is lined with a durable metal bearing 72. A vertical transmission shaft 74 is rotatably received through the vertical bore 66 and is rotatably supported or confined by the bearings 72. The vertical transmission shaft 74 is held in rigid vertical disposition in the vertical bore 66 by retaining clips 76 fastened in circumferential recesses 78 in the shaft 74. A first adapter 79 is crimped onto the lower end of the shaft 74. The lower end of the sleeve 52 extends below the bottom 50 of the retaining block 34 through hole 53 in the underside of the housing 12 such that the threaded portion 56 extends below and out of the housing 12. The lower end of the vertical transmission shaft 74, including adapter 79, are freely and rotatably disposed in and protected by the lower end of sleeve 52.

A first beveled gear 80 is provided on the bird wing member support 38 between the upper extensions 36 of the retention block 34. The first beveled gear 80 is fixed to the bird wing member support 38 with a set screw (not illustrated). It will be recognized by those familiar with the art that the beveled gear could also be an integral part of the shaft or attached to the shaft by other methods, such as with an adhesive or by spot welding.

A second beveled gear 82 is provided on the upper end of the transmission shaft 74. The second beveled gear 82 is attached to the transmission shaft 74 with a set screw (not illustrated). However, as with the first beveled gear, it will be appreciated that the second beveled gear 82 may be an integral part of the drive shaft, or held in place by any suitable means, such as gluing or spot welding. The first and second beveled gears 80 and 82 mesh so that rotation of the vertical transmission shaft 74 translates to rotation of the bird wing member support 38.

Each bird wing member 14 has a wing shaft 84 for attachment of the wing members 14 to the housing 12. Each wing shaft 84 has an inner end 86 in which is provided a center bore sized for insertion therein of one end of the bird wing member support 38. Attachment of the wing member 14 to the housing 12 is thus performed by slipping the wing shaft 84 over the end of the bird wing member support 38. The wing shaft 84 is held in place on the bird wing member support 38 by two set screws (not illustrated) on opposite sides of the wing shaft 84. It will be recognized by those familiar with the art that the wing shaft could be retained in place using a system of cotter pins and holes, spring clips, a snap fitting, or any other means reasonably calculated to secure the wing members to the wing member support.

Spaced laterally from each side of the retention block 34 are provided stanchions 90 integrally joined to and extending uprightly from the chassis 32. In each stanchion 90 is provided an annular passageway 92 having a diameter slightly larger than the cross-sectional diameter of the wing shafts 84. Each wing shaft 84 rotates freely within one of the passageways 92 and receives additional support from the stanchions 90.

Referring to FIGS. 3A, 3B, 6 and 6A, a hinge 96 in each wing member provides for hinged connection of the wing member 14 to the housing 12. Referring to FIG. 6A, the hinge 96 comprises a hinge plate 98, pivot pin 100, and the wing shaft 84. The hinge plate 98 is fixed to the proximate portion 102 of the wing member 14 and is incorporated in the gross outline of the wing. The hinge plate 98 is pivotally connected to the wing shaft 84 about the pivot pin 100 located at the inner edge 104 of the hinge plate 98 leaving the inner portion 106 of the wing shaft 84 free for attachment to the bird wing member support 38 as described above. The hinge plate 98 is further provided with a channel 108 dimensioned to receive the outer portion 110 of the wing shaft 84. In the distal end 112 of the channel is provided a snap fitting 114 for holding the outer portion 110 of the wing shaft 84 in the channel 108. The snap fitting 114 comprises opposing resilient jaws 118 spaced apart slightly less than the diameter of the wing shaft's outer portion 110 which, when pressed into the channel, urges apart the jaws 118, thereby allowing the wing shaft 84 to be received fully into the channel 108. When the outer portion 110 of the wing shaft 84 is fully embedded in the channel 108, the resilient jaws 118 spring back to hold the wing shaft 84 in place.

As shown in FIG. 6A, the wing member 14 is movable about pivot axis A defined by the pivot pin 100 of the hinge 96, between a fully extended position E (as seen in FIG. 3A) and a folded wing position F (as seen in FIG. 3B). When wing member 14 is disposed in the fully extended position E, the outer portion 110 of the wing shaft 84 is fully received within the channel 108 of the hinge plate 98 and is embraced within the overall wing member structure. With the wing shaft 84 fully received in the channel 108, the wing member 14, hinge plate 98, and wing shaft 84 are in linear alignment enabling a balanced rotation of the wing member 14 about an axis defined by the bird wing member support 38. The snap fitting 114 holds the wing shaft 84 in the channel 108 with sufficient force to retain indefinitely the wing member 14 in the fully extended position during rotation of the wings. The wing member 14 may be returned to the folded position F by pressing the wing member 14 toward the folded position F with sufficient force to lever the outer portion 110 of the wing shaft 84 out of the channel 108 and force the jaws 118 of the snap fitting 114 apart. In the folded position F, the wing members 14 are disposed adjacent the decoy housing 12 for a markedly reduced overall profile of the decoy. The ability to fold and unfold the wings allows the decoy to be quickly deployed during set up or immediately collapsed for storage or transport without the necessity of attaching or detaching the wing members 14 to or from the housing 12. In both the fully extended and folded positions, the wing shafts 84 will generally remain attached to the bird wing member support 38. However, the wing shafts 84 may be detached from the bird wing member support 38 anytime as needed by loosening the set screws and pulling the wing shafts 84 off of the bird wing member support 38 and out of the housing 12.

Operation of the decoy from a remote location is effected by using a flexible cable 16 which is of the kind commonly used in automobiles. A flexible cable 16 fully encased in a tubular sheath 120, has first and second ends 122 and 124 (see FIGS. 4A and 5 respectively). The first end 122 is in direct operative communication with the second end 124 such that rotation of the first end directly and immediately rotates the second end, and vice-versa. Each end of the sheath 120 is slidingly inserted in an aperture 126 in the back of first and second internally threaded knurled retention caps 128 and 130 dimensioned for maintaining each cap in freely rotatable and sliding disposition on the ends of the sheath 120. Each cap 128, 130 is held in place on the sheath 120 by a fitting 132 having its terminus 134 flared to a diameter greater than the aperture 126.

Referring again to FIG. 4A, the sleeve 52 protruding from the bottom portion of the housing 12 is provided with threaded portion 56 for mating cooperation with the interior threads 138 on the retention cap 128 on the first end 122 of the flexible cable 16. The second end 124 of the cable 16 is connected to the foot pedal 18, as described below.

Figure 5:
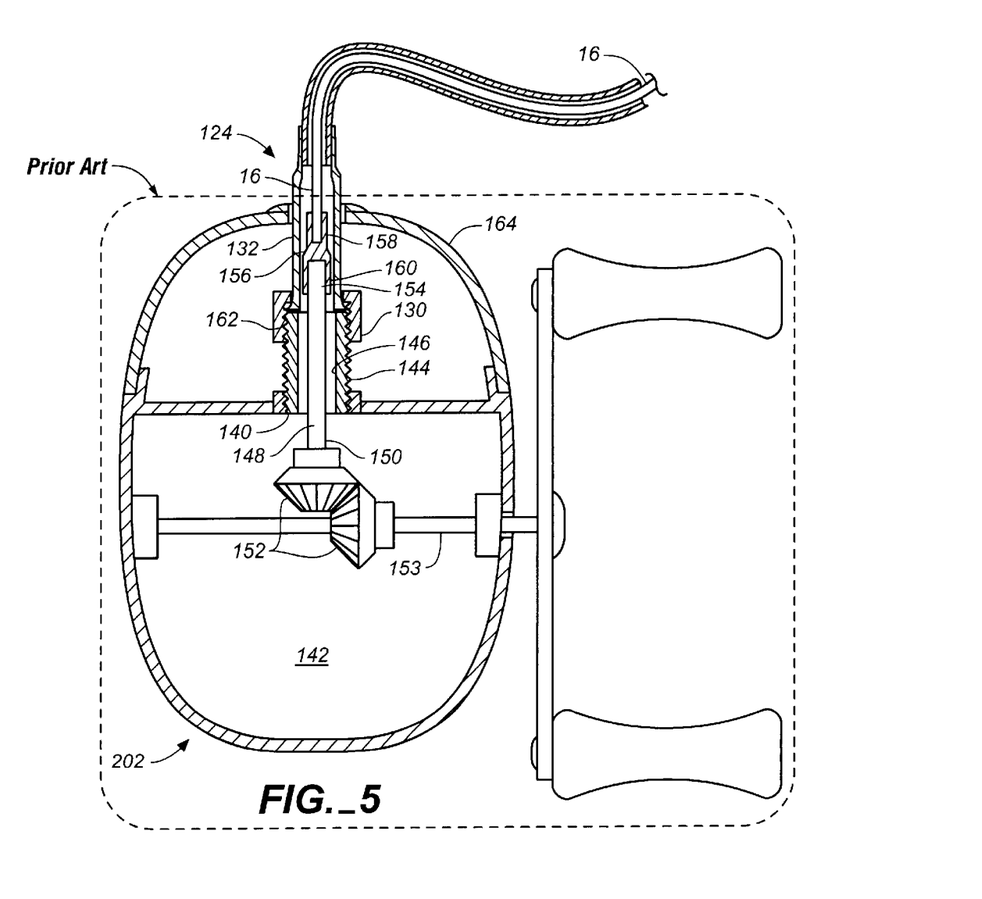
FIG. 5 is a sectional view of a fishing reel used in the prior art and of the second end of the flexible cable shown in FIG. 1.

With reference to FIGS. 1 and 5, the existing art incorporated a conventional fishing reel 18. The improved form of the invention seen in FIG. 8 provides a foot pedal 18, flywheel 200 and gear housing 202 enabling hands-free rotation of the cable 16 and bird wing members 14, and eliminating the fishing reel housing and handle which require use of both hands. The preferred embodiment of the invention incorporates in the gear housing 202 the internal workings of the fishing reel similar to those as shown in FIG. 5. Therefore, with reference to FIGS. 5 and 8, an internally threaded opening 140 admits entry into the gearing compartment 142. A short externally threaded nipple 144 having a central through bore 146 is screwed into the threaded opening 140. A drive shaft 148 is freely and rotatably disposed in the bore 146, which has a cross-sectional diameter only slightly greater than that of the drive shaft 148. The drive shaft 148 is thus freely and rotatably disposed in the bore 146. The nipple 144 effectively acts as a bushing to hold the drive shaft 148 in place during rotation and to limit motion transverse to the rotational axis of the drive shaft 148. Any means of retaining the shaft in place and controlling its transverse motion could be used in lieu of the nipple. A first end 150 of the shaft 148 is operatively attached to the gearing 152 of the gear housing 202 such that when the internal gear shaft 153 is turned, that motion is rotatably transmitted to the drive shaft 148. A second end 154 of the drive shaft 148 extends out of the bore 146. In the preferred embodiment an adapter 156 is provided having a cable end 158 and a housing end 160. The housing end 160 is screwed onto the drive shaft 148, but it will be understood that it could be secured by any conventional means such as welding, gluing, set screws, crimping, or and other method familiar to those skilled in the art: The cable end 158 of the second adapter 156 is crimped onto the second end 124 of the flexible cable 16 completing the connection of the cable 16 to the gear housing 202. A portion 162 of the exterior threads of the nipple are left exposed and onto which the second retention cap 130 is screwed, thus securing the cable 16 and sheath 120 to the gear housing 202. A cover 164 is then screwed onto the housing 202, encasing the second end 124 of the flexible cable 16, second adapter 156, nipple 144, and drive shaft 148, protecting the workings and providing a simple and aesthetically pleasing presentation.

Figure 4C:
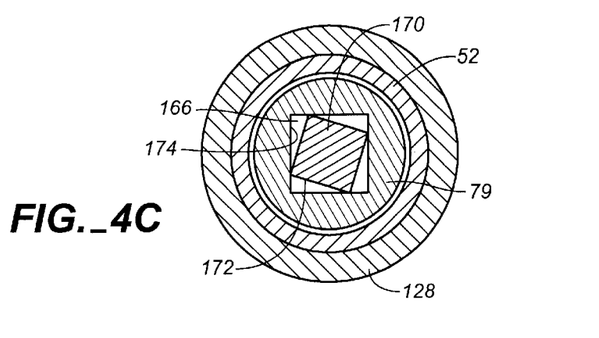
FIG. 4C is a sectional view taken along lines 4C—4C of FIG. 4.

Referring to FIG. 4C, the lower end of the adapter 79 on the vertical transmission shaft 74 includes a downward facing aperture 166 having a rectilinear cross-section. In the preferred embodiment, the aperture 166 is square-shaped. The adapter 79 extends downward to approximately the bottom end 168 of the threaded sleeve 52. The first end 122 of the flexible cable 16 terminates in a short extension 170 having a square cross-section, and extends slightly upward from the first retention cap 128. The aperture 166 in the first adapter 79 is slightly larger than the cross-sectional dimension of the extension 170 of the cable 16 such that the extension 170 may be easily inserted into the aperture 166. To connect the flexible cable 16 to the housing 12, the extension 170 of the cable 16 is inserted into the aperture 166 in the adapter 79, and the cable's first retention cap 128 is threaded onto the sleeve 52. Although the aperture 166 is sized slightly larger than the cross-section of the extension 170, it is small enough that, when the cable 16 is rotated, the outer faces 172 of the extension 170 and the inner faces 174 of the aperture 166 come into sufficiently positive contact to rotate the adapter 79 and, hence, the transmission shaft 74. The transmission shaft 74 in turn rotates the bird wing members 14. It will be appreciated that, while the aperture 166 is square-shaped in the illustrated embodiment, it could be any shape, e.g., a rectangle or even an oval, which provides two opposing faces in close enough proximity for the outer faces 172 of the extension 170 to come sufficiently into contact therewith to rotate the adapter 79 and, hence, the transmission shaft 74.

Referring to FIG. 2, the decoy is mounted using a support stand 180 comprising two interlocking, telescoping support shafts 182,184. An upper support shaft 182 has a hollow interior slightly larger in size than the outer dimensions of the lower shaft 184, such that the lower support shaft 184 may be telescopically inserted into the upper support shaft. In the preferred embodiment, the lower support shaft 184 has a spring-loaded protuberance 186 which projects outwardly beyond the exterior surface of the shaft but is resiliently depressable into the shaft to the level of the shaft's exterior surface. The upper support shaft 182 is provided with at least one side hole 188 for mating alignment with the spring-loaded protuberance 186 in the lower support shaft 184. Alignment of the protuberance 186 of the lower support shaft 184 with the hole 188 in the upper shaft 182 allows the protuberance 186 to pop into the hole 188 and detachably lock the support shafts 182,184 in relative disposition. In the preferred embodiment, the upper support shaft 182 is provided with several aligned holes allowing for selection of the overall length of the support stand 180.

At the upper portion of the upper support shaft 182 are provided two handles 190,190' on opposite sides of the shaft for handling and manipulation of the support stand 180. In the preferred embodiment, one handle is vertically displaced along the support stand relative to the other for more easily adjusting the position of the bottom end of the stand from side-to-side and forward and back.

Referring still to FIG. 2, the bottom portion of the decoy housing 12 has a downwardly-extending mounting stud 192. The top of the upper support shaft 182 of the support stand 180 has a hollow interior 194 allowing the mounting stud to 192 be inserted therein for mounting the decoy. In the preferred embodiment, the support stand 180 and mounting stud 192 are squared for enhanced control against twisting of the mounted decoy housing 12. It will be recognized by those skilled in the art that the support stand and mounting shaft could be round or any other shape consistent with supporting the apparatus.

Finally, referring to FIG. 8, a flywheel 200 is provided in direct communication with the gear housing 202. The gear shaft 153 extends from the housing 202 and is connected to the flywheel 200 at its central pivot axis. The housing 202, flywheel 200 and foot pedal 18 are all fixed in relation to each other by being mounted on a base 204. A power takeoff 206 extends between the flywheel 200 and foot pedal 18. The power takeoff 206 includes a first member 208 having a proximal portion 210 affixed to the flywheel 200 at its pivot axis and a distal portion 212 extending laterally of the flywheel 200 and radially spaced from the proximal portion 210 such that the distal portion 212 travels in a circular path in concert with the flywheel 200. A second member 214 of the power takeoff 206 includes a first end 216 pivotally affixed to the distal portion 212 of the first member. A second end 218 of the second member is hingedly affixed to the foot pedal 18. The foot pedal is pivotally fixed, e.g., by a piano hinge, to the base 204. In this arrangement it can be seen that moving the foot pedal between an upper position and a lower position, the distal portion of the first member is caused to move in an annular path around the central pivot axis of the flywheel 200 which movement is ultimately transmitted to the bird wing members 14. Pedal manipulation of the bird wing members has the distinct advantage of freeing use of both hands when attention becomes focused on waterfowl attracted by the decoy.

In normal field operation, the decoy is mounted on the support stand at a selected location. If the decoy is one resembling a waterfowl, the support stand will likely be anchored in the earth below a shallow body of water, positioning the decoy above the surface of the water at a height conducive to creating the appearance of a bird about to land on the surface of the water. Either before or after mounting the decoy, the first end 122 of the cable 16 is attached to the decoy housing 12 and the cable 16 deployed such that the second end 124 of the cable 16, with the foot pedal 18 attached, is disposed at a location remote from the decoy, e.g., in a camouflaged blind. The bird wing members 14 of the decoy can then be rotated from the remote location at the desired distance from the decoy by operating the foot pedal 18 at a selected rate. Pedal manipulation of the wings eliminates the need for batteries and allows for more controlled movement of the wings, as opposed to the constant speed of rotation achieved with electronically powered animated devices.

While the preferred embodiment describes a foot pedal 18 for rotationally driving the flexible cable 16 and, in turn, the bird wing members 14, it will be recognized by those skilled in the art that there are numerous ways to rotate the second end of the cable 16, such as using a small motor, a hand crank, a scissor mechanism, ratchet gear, or by adapting a sewing machine pedal. Further, while the preferred embodiment provides a black tubular sheath, an alternate embodiment of the apparatus could be provided with a camouflaged sheath cover for more effective masking of the cable 16. In either embodiment, a distinct advantage of the cable 16 is that it sinks from view in any water surrounding the decoy.

The preferred embodiment of the device describes a dual winged bird replica, wherein the wings rotate on a common axis. It should be readily apparent to those skilled in the art that the flexible cable 16 is capable of controlling any other kind of wing movement that might be provided in association with a bird replica. Accordingly, an alternate embodiment of the device could include flapping wings. Finally, although the illustrated embodiment depicts and describes a foot pedal 18 for transmission of rotational power to the decoy, any of numerous gearing combinations are capable of converting manual power into rotation. Such gear boxes could include beveled gears, rack-and-pinion gears, or worm gears, as appropriate.

There have been described and illustrated certain preferred embodiments of a cable-driven animated bird replica apparatus according to the invention. Although the present invention has been described and illustrated in detail, it should be clearly understood that the same is by way of illustration and example only, and is not to be taken by way of limitation, the spirit and scope of the present invention being limited only by the terms of the appended claims and their legal equivalents.

I claim:

1. A cable-driven animated bird replica apparatus comprising:
   a flexible cable having a first end and a second end, said first end in rotational communication with said second end, and
   foot pedal means for rotatably driving said second end of said cable by operation of a foot pedal at a remote location from said housing for hands-free rotation of said first end.

2. The cable-driven animated bird replica apparatus of claim 1 further comprising:
   a housing having the configuration of a bird's body, a pair of bird wing members extending from said housing, said bird wing members rotatably connected to said first end of said cable for controlled rotation of bird wing members from a remote location relative to said housing.

3. A cable-driven animated bird replica apparatus comprising:
   a housing having the configuration of a bird's body,
   a pair of bird wing members extending outwardly from opposite sides of said housing laterally of said longitudinal axis and being attached to said housing,
   a flexible cable having a first end and a second end, said first end in rotational communication with said second end, and said first end in operative communication with said pair of bird wing members, and
   foot pedal means for rotatably driving said second end of said cable by operation of a foot pedal at a remote location from said housing for hands-free rotation of said bird wing members.

4. The cable-driven animated bird replica apparatus of claim 3 wherein said foot pedal means comprises:
   a first plurality of gears rotatably connected to said first end and to said pair of bird wing members,
   a second plurality of gears rotatably connected to said second end of said cable, and
   a flywheel rotatably connected to said second plurality of gears, said flywheel having a central axis, said flywheel rotatable around said central axis, said flywheel having a power takeoff extending laterally therefrom, said takeoff having a first member affixed to said flywheel, said first member having a proximal portion pivoting around said central axis of said flywheel, said first member further having a distal portion extending and spaced radially from said proximal portion, said power takeoff further having a second member, said second member having a first end pivotally affixed to said distal portion of said first member, and said second member having a second end hingedly connected to said foot pedal, said second end moveable by depression and release of said foot pedal between an upper position and a lower position, movement of said second end of said second member causing said distal portion of said first member to move in an annular path around said central axis of said flywheel, said foot pedal fixed in relation to said flywheel such that repeated depression of said foot pedal causes said flywheel to rotate.

5. A cable-driven animated bird replica apparatus comprising:
   a housing having the configuration of a bird's body, a head end, a tail end, and a longitudinal axis extending between said head end and said tail end,
   a pair of bird wing members rotatably connected to said housing between said head end and said tail end, said pair of bird wing members extending outwardly from opposite sides of said housing laterally of said longitudinal axis and fully rotatable around a common axis, said pair of bird wing members resembling a pair of extended bird wings,
   a flexible cable having a first end and a second end, said first end in rotational communication with said second end, said first end rotatably connected to said pair of bird wing members, and
   foot pedal means for rotatably driving said second end of said cable by operation of a foot pedal at a remote location from said housing for hands-free rotation of said bird wing members.

6. The cable-driven animated bird replica apparatus of claim 5 wherein said foot pedal means comprises:
   a plurality of gears, said plurality of gears connected to said second end of said flexible cable, a foot pedal, and a flywheel rotatably connected to said plurality of gears, said flywheel having a central axis, said flywheel rotatable around said central axis, said flywheel having a power takeoff extending laterally therefrom, said takeoff having a first member affixed to said flywheel, said first member having a proximal portion pivoting around said central axis of said flywheel, said first member further having a distal portion extending and spaced radially from said proximal portion, said power takeoff further having a second member, said second member having a first end pivotally affixed to said distal portion of said first member, and said second member having a second end hingedly connected to said foot pedal, said second end moveable by depression and release of said foot pedal between an upper position and a lower position, movement of said second end of said second member causing said distal portion of said first member to move in an annular path around said central axis of said flywheel, said foot pedal fixed in relation to said flywheel such that repeated depression of said foot pedal causes said flywheel to rotate.

7. A cable-driven animated bird replica apparatus comprising:

a housing having the configuration of a bird's body, said housing having an interior cavity, and a bird wing member support in said interior cavity, said bird wing member support having a first gear, a retention block in said interior cavity secured to said housing, said retention block having a bottom portion including an annular recessed channel, a vertical transmission shaft having a second gear in operative engagement with said first gear, said bird wing member support and said vertical transmission shaft each rotatably secured to said retention block, a pair of bird wing members extending laterally from opposite sides of said housing, said pair of bird wing members attached to said bird wing member support, a flexible cable having a first end and a second end, said first end in rotational communication with said second end, said first end of said cable connected to said vertical transmission shaft, a tubular sleeve having a threaded portion, said tubular sleeve having an outer diameter, said annular recessed channel of said retention block having a diameter slightly greater than said outer diameter of said tubular sleeve, said tubular sleeve secured to said retention block in said channel, said housing having an underside having therein a hole, said threaded portion of said sleeve extending from said retention block through said hole, said first end of said cable further comprising a rotatable retention cap, said retention cap threadedly joined to said threaded portion of said sleeve, and means for rotationally driving said second end of said cable at a remote location from said housing for controlled movement of said bird wing members.

8. The cable-driven animated bird replica apparatus of claim 7 including:

at least one threaded fastener for securing said tubular sleeve in said channel of said retention block.

9. The cable-driven animated bird replica apparatus of claim 7 wherein:

said means for driving said second end comprises foot pedal means for rotation of said second end of said cable by operation of a foot pedal for hands-free movement of said bird wing members.

10. The cable-driven animated bird replica apparatus of claim 9 wherein:

said foot pedal means comprises a plurality of gears, said plurality of gears connected to said second end of said flexible cable, a flywheel rotatably connected to said plurality of gears, a foot pedal, and means for rotation of said flywheel by depressing said foot pedal.

11. The cable-driven animated bird replica apparatus of claim 10 wherein said means for rotation of said flywheel comprises:

said flywheel, having a central axis, said flywheel rotatable around said central axis, said flywheel having a power takeoff extending laterally therefrom, said takeoff having a first member affixed to said flywheel, said first member having a proximal portion pivoting around said central axis of said flywheel, said first member further having a distal portion extending and spaced radially from said proximal portion, said power takeoff further having a second member, said second member having a first end pivotally affixed to said distal portion of said first member, and said second member having a second end hingedly connected to said foot pedal, said second end moveable by depression and release of said foot pedal between an upper position and a lower position, movement of said second end of said second member causing said distal portion of said first member to move in an annular path around said central axis of said flywheel, said foot pedal fixed in relation to said flywheel such that repeated depression of said foot pedal causes said flywheel to rotate.

12. The cable-driven animated bird replica apparatus of claim 9 wherein:

said bird wing members are fully rotatable around a common axis.

13. The cable-driven animated bird replica apparatus of claim 12 further comprising:

means for releasably locking each said bird wing member in a disposition parallel with said common axis.

14. The cable-driven animated bird replica apparatus of claim 7 wherein:

said means for driving comprises a plurality of gears rotatably connected to said second end of said cable.

15. The cable-driven animated bird replica apparatus of claim 14 wherein:

said means for driving comprises a foot pedal.

16. The cable-driven animated bird replica apparatus of claim 7 wherein:

said means for driving comprises a foot pedal.

17. The cable-driven animated bird replica apparatus of claim 7, wherein:

said first gear and said second gear comprise bevel gears.

18. The cable-driven animated bird replica apparatus of claim 7 further comprising:

said vertical transmission shaft having a lower end, a first end adapter having a downward facing orifice, said first end adapter attached to said lower end of said transmission shaft, said orifice having at least two opposing substantially parallel inner faces for receiving therebetween said first end of said flexible cable, and said first end of said flexible cable having a rectilinear cross-section defining at least two oppositely disposed substantially parallel outer faces, said outer faces for detachable engagement with said inner faces of said orifice upon insertion of said first end of said cable into said orifice and thereafter rotation of said first end of said cable.

19. The cable-driven animated bird replica apparatus of claim 18 further comprising:
    a second end adapter secured to said second end of said cable,
    and wherein said means for driving comprising foot pedal means for rotation of said second end adapter by operation of a foot pedal for hands-free movement of said bird wing members.

20. The cable-driven animated bird replica apparatus of claim 19 wherein:
    said second end adapter is crimped to said second end of said cable, and said second end adapter is threadedly engaged with said foot pedal means.

21. The cable-driven animated bird replica apparatus of claim 7 further comprising:
    said housing having an interior surface,
    a chassis secured to said interior surface of said housing,
    said retention block secured to said chassis,
    said bird wing member support extending between and supporting said bird wing members,
    each bird wing member having a wing shaft, each said wing shaft having an inner end, each said inner end detachably attached to said bird wing member support, and
    said chassis having a pair of upwardly extending stanchions, each said stanchion disposed in said interior cavity of said housing between said retention block and said interior surface of said housing, each stanchion having an annular passageway, each of said wing shafts rotatably received in one of said passageways, said stanchions supporting said wing shafts.

22. The cable-driven animated bird replica apparatus of claim 7 wherein:
    said housing simulates the body of a duck.

23. The cable-driven animated bird replica apparatus of claim 7 wherein:
    said housing simulates the body of a goose.

24. The cable-driven animated bird replica apparatus of claim 7 wherein:
    said housing simulates the body of an owl.

25. The cable-driven animated bird replica apparatus of claim 7 further comprising:
    an elongated support stand connected to said housing, said support stand extending downwardly from said housing, said support stand having a lower distal end for anchoring in the earth under a body of water and having adequate length to support said housing sufficiently above the surface of a body of water such that said bird wing members are out of contact with the water, but close enough to the surface of the water such that said housing and said bird wing members simulate a bird in flight near a surface of a body of water with wings extended as though about to land.

26. The cable-driven animated bird replica apparatus of claim 7 further comprising:
    said bird wing member support extending between and supporting said bird wing members, each said bird wing member hingedly connected to said wing member support about a hinge axis, said hinge axis in transverse disposition relative to said wing member support.

27. The cable-driven animated bird replica apparatus of claim 26 further comprising:
    said pair of bird wing members fully rotatable around a common axis, and
    means for releasably locking each said bird wing member to said bird wing member support.

28. The cable-driven animated bird replica apparatus of claim 26 further comprising:
    each bird wing member having a wing shaft, each said wing shaft having an inner end and an outer end, each said inner end removably attached to said bird wing member support,
    each said bird wing member further having a hinge, each said hinge having a channel, said channel sized for receiving therein the outer end of one of said wing shafts, each said bird Wing member moveable between a folded position and a fully extended position, in said fully extended position said outer end of said wing shaft received in said channel.

29. The cable-driven animated bird replica apparatus of claim 28 further comprising:
    said channel of each of said hinges having means for releasably locking therein said outer end of said wing shaft.

30. A method of attracting bird comprising:
    anchoring at a suitable location an animated bird replica which includes a housing that simulates a bird body,
    choosing a location remote from said housing,
    deploying a flexible cable having a first end and a second end between said housing and said remote location,
    rotatably connecting said first end to a pair of bird wing members rotatably connected to said housing between the head end and tail end thereof, said wing members extending laterally of the longitudinal axis of said housing from opposite sides of said housing and being fully rotatable about an axis of rotation substantially perpendicular to said housing's longitudinal axis,
    rotatably connecting said second end to a foot medal means for rotatably driving said second end of said cable, and
    rotating said bird wing members using said foot pedal means at said remote location to simulate an animated bird.

31. A method of attracting waterfowl to a location over the surface of the water comprising:
    choosing a suitable location over the surface of a body of water having earth below the surface of the water in which a support stand of an animated bird replica can be anchored,
    providing a bird replica which includes a housing having a housing top that simulates a substantially complete bird body with a head end, a tail end, and a longitudinal axis extending between said head end and said tail end, and which further includes a pair of bird wing members rotatably connected to said housing between the head end and tail end thereof, said wing members extending laterally of the longitudinal axis of said housing from opposite sides of said housing and being fully rotatable about an axis of rotation substantially perpendicular to the housing's longitudinal axis,
    supporting said bird replica on a support stand of suitable length capable of being anchored in the earth below the surface of the water at the chosen suitable location sufficiently above the surface of the water such that the wing members are out of contact with the water, but close to the surface of the water to simulate a bird in flight with wings extended about to land on the surface of the water, rotatably connecting a first end of a flexible cable to said bird wing members, choosing a location remote from said housing, deploying said flexible cable between said housing and said remote location, rotatably connecting a second end of said flexible cable to a plurality of gears, and rotating a flywheel connected to said plurality of gears at said remote location by repeated depression of a foot pedal operatively associated with said flywheel to rotate said bird wing members to simulate an animated bird in flight about to land on the surface of the water.

* * * * *